United States Patent
Fang et al.

(10) Patent No.: US 10,809,915 B2
(45) Date of Patent: Oct. 20, 2020

(54) AUTOMATIC CREDENTIAL INPUT TO A USER INTERFACE OF A REMOTE MOBILE APP

(71) Applicant: Trend Micro Incorporated, Tokyo (JP)

(72) Inventors: Xinxin Fang, Nanjing (CN); Junwen Sun, Nanjing (CN); Chengyu Fang, Nanjing (CN)

(73) Assignee: Trend Micro Incorporated, Tokyo (JP)

(*) Notice: Subject to any disclaimer, the term of this patent is extended or adjusted under 35 U.S.C. 154(b) by 35 days.

(21) Appl. No.: 16/277,615

(22) Filed: Feb. 15, 2019

(65) Prior Publication Data
US 2020/0264752 A1 Aug. 20, 2020

(51) Int. Cl.
| | |
|---|---|
| G06F 3/0489 | (2013.01) |
| H04W 4/20 | (2018.01) |
| H04W 12/00 | (2009.01) |
| G06F 3/0488 | (2013.01) |
| G06F 21/31 | (2013.01) |
| H04W 12/06 | (2009.01) |
| G06F 40/174 | (2020.01) |
| H04L 29/06 | (2006.01) |
| G06F 21/41 | (2013.01) |

(52) U.S. Cl.
CPC ........ *G06F 3/0489* (2013.01); *G06F 3/04886* (2013.01); *G06F 21/41* (2013.01); *G06F 40/174* (2020.01); *H04L 63/083* (2013.01); *H04L 67/42* (2013.01); *H04W 4/20* (2013.01); *H04W 12/0023* (2019.01); *G06F 21/31* (2013.01); *H04W 12/06* (2013.01)

(58) Field of Classification Search
CPC ..... G06F 40/174; G06F 21/41; H04L 63/083; H04L 67/42
See application file for complete search history.

(56) References Cited

U.S. PATENT DOCUMENTS

| | | |
|---|---|---|
| 9,225,799 B1 | 12/2015 | Dong et al. |
| 9,300,720 B1 | 3/2016 | Qiu et al. |
| 9,444,912 B1 * | 9/2016 | Chen ................ H04L 69/08 |
| 9,654,603 B1 | 5/2017 | Dong et al. |

(Continued)

OTHER PUBLICATIONS

Tzi-cker Chiueh et al., "Smartphone Virtualization," 2016 IEEE 22nd International Conference on Parallel and Distributed Systems, ISBN (Electronic): 978-1-5090-4457-3 ISSN (Paper): 1521-9097 Digital Object Identifier: 10.1109/ICPADS.2016.0028 (Year: 2016).*

*Primary Examiner* — James T Tsai
(74) *Attorney, Agent, or Firm* — Okamoto & Benedicto LLP

(57) ABSTRACT

A server computer runs several remote mobile operating systems. A remote mobile app running on one of the remote mobile operating systems generates a user interface that includes an input field for receiving a credential. The user interface is displayed on a touchscreen of a mobile device that is in communication with the server computer. A touchscreen keyboard with an autofill button is displayed on the touchscreen. When a user of the mobile device clicks on the autofill button, the credential of the user is retrieved and sent from the mobile device to the server computer, where the credential is entered into the input field.

15 Claims, 7 Drawing Sheets

(56) References Cited

U.S. PATENT DOCUMENTS

| | | | |
|---|---|---|---|
| 10,169,628 B1 | 1/2019 | Sun et al. | |
| 2014/0157390 A1* | 6/2014 | Lurey | G06F 21/41 726/7 |
| 2018/0337918 A1* | 11/2018 | Chang | G06F 3/0481 |
| 2019/0147195 A1* | 5/2019 | Wu | G06F 21/83 726/26 |

* cited by examiner

US 10,809,915 B2

AUTOMATIC CREDENTIAL INPUT TO A USER INTERFACE OF A REMOTE MOBILE APP

BACKGROUND OF THE INVENTION

1. Field of the Invention

The present invention relates generally to mobile devices, and more particularly but not exclusively to computing infrastructures for supporting operation of mobile devices.

2. Description of the Background Art

Mobile devices, such as smartphones and tablets, have become commonplace and are now employed as replacements for portable (e.g., laptops and netbooks) and desktop (e.g., personal computers) computing devices. For example, smartphones are now employed not just to make voice calls over traditional mobile telephone networks, but also to browse the Internet, watch streamed video, and play online games. The number of mobile apps for mobile operating systems is growing each day.

Despite their increasing sophistication, mobile devices have limited computing resources relative to portable and desktop computing devices. Accordingly, mobile devices run mobile operating systems, such as the ANDROID and the iOS operating systems. An application program suitable for a mobile operating system is referred to as a "mobile app" or simply as an "app." Apps may be obtained from an app store, such as the GOOGLE app store and AMAZON app store for ANDROID-based mobile devices and the APPLE app store for iOS-based mobile devices.

Virtual mobile infrastructures comprising one or more server computers that each hosts a plurality of mobile operating systems have been developed to allow users of mobile devices to access mobile apps that run on the server computers. That is, instead of executing a mobile app on a mobile device of a user, the mobile app is executed on a server computer of the virtual mobile infrastructure. The user employs his mobile device to interact remotely with the mobile app. Example virtual mobile infrastructures are disclosed in commonly-assigned U.S. Pat. Nos. 9,444,912, 9,225,799, 9,654,603, 9,300,720, and 10,169,628, the contents of which are incorporated herein by reference in their entirety.

Embodiments of the present invention provide autofill features for mobile apps of virtual mobile infrastructures.

SUMMARY

In one embodiment, a server computer runs several remote mobile operating systems. A remote mobile app running on one of the remote mobile operating systems generates a user interface that includes an input field for receiving a credential. The user interface is displayed on a touchscreen of a mobile device that is in communication with the server computer. A touchscreen keyboard with an autofill button is displayed on the touchscreen. When a user of the mobile device clicks on the autofill button, the credential of the user is retrieved and sent from the mobile device to the server computer, where the credential is entered into the input field.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

A remote mobile app is "remote" in that it is running on a server computer instead of a mobile device employed by a user to access the remote mobile app. Generally speaking, autofill may be implemented with a remote mobile app by integrating dedicated autofill code in the remote mobile app. A problem with this approach is that the developer of the remote mobile app may need to cooperate with the operator of the virtual mobile infrastructure for each remote mobile app. This approach is not practical given that the developer of the remote mobile app and the operator of the virtual mobile infrastructure are typically different entities.

One distinguishing feature of some mobile apps compared to regular applications is that mobile apps may be unpacked and repacked. A mobile app may thus be unpacked, integrated with autofill code, and then repacked before deployment on the virtual mobile infrastructure. A problem with this approach is that the developer of a mobile app may not give the operator of the virtual mobile infrastructure legal permission to unpack/repack the mobile app. Embodiments of the present invention provide a general autofill feature that will work with different mobile apps.

Figure 1:
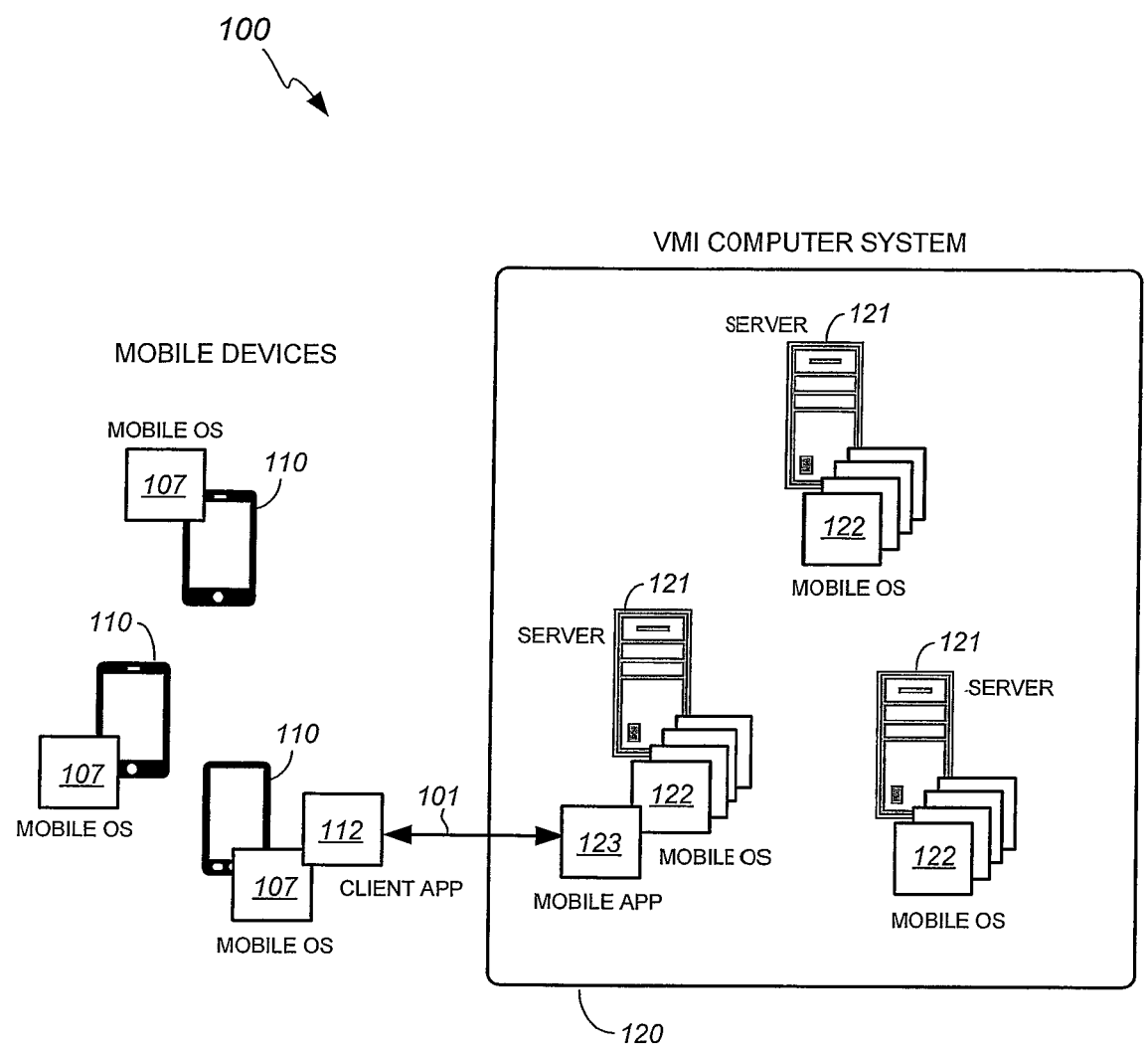
FIG. 1 shows a logical diagram of a virtual mobile infrastructure in accordance with an embodiment of the present invention.

FIG. 1 shows a logical diagram of a virtual mobile infrastructure 100 in accordance with an embodiment of the present invention. In one embodiment, the virtual mobile infrastructure 100 is similar to those disclosed in U.S. Pat. Nos. 9,444,912, 9,225,799, 9,654,603, 9,300,720, and 10,169,628, with appropriate changes as disclosed below.

The virtual mobile infrastructure 100 may comprise a plurality of mobile devices 110 and a virtual mobile infrastructure (VMI) computer system 120 that comprises one or more server computers 121. Communications between components of a mobile device 110 and components of a server computer 121 may be performed as described in the aforementioned US patents, or some other way without detracting from the merits of the present invention.

Generally speaking, as its name implies, a mobile operating system is an operating system designed to run on a mobile device, which may be a smartphone or a tablet. A mobile operating system is lightweight in that it consumes less computing resources, such as processor and memory resources, compared to a desktop operating system. In the case of a smartphone or a tablet with suitable connectivity, a mobile operating system may also support communications over a mobile phone network, such as a cellular network, to provide telephony functionality.

In one embodiment, a server computer 121 comprises a single LINUX operating system server that runs one or more mobile operating systems 122. In one embodiment, a mobile operating system 122 is an ANDROID operating system that is implemented on a LINUX container. A mobile operating system 122 is also referred to herein as a "remote mobile operating system" to distinguish it from a mobile operating 107 system running on a mobile device 110, which is also referred to as "local mobile operating system." In general, components on a mobile device 110 are referred to herein as "local" components, and components on a server computer 121 are referred to herein as "remote" components.

A mobile device 110 may include a client app 112 that runs under a mobile operating system 107 of the mobile device 110. The user of the mobile device 110 may employ the client app 112 to access a mobile app 123 (see arrow 101) that is running under a mobile operating system 122 of a server computer 121. A mobile device 110 and a server computer 121 may communicate over a computer network, which may include the Internet and/or a private computer network.

One or more mobile apps 123 may run under a single mobile operating system 122. A user of a mobile device 110 accesses a mobile app 123 as if the mobile app 123 is running on the mobile device 110. The screen image of the mobile operating system 122 may be displayed on the touchscreen of the mobile device 110. The user may optionally replace the mobile device 110 with another mobile device 110 to access the same mobile app 123 running under the same mobile operating system 122. This is particularly advantageous in workplaces that allow employees to use their own personal mobile devices. In particular, the virtual mobile infrastructure 100 allows employees with different mobile devices 110 to work on mobile apps running on remote mobile operating systems in a controlled environment.

Figure 2:
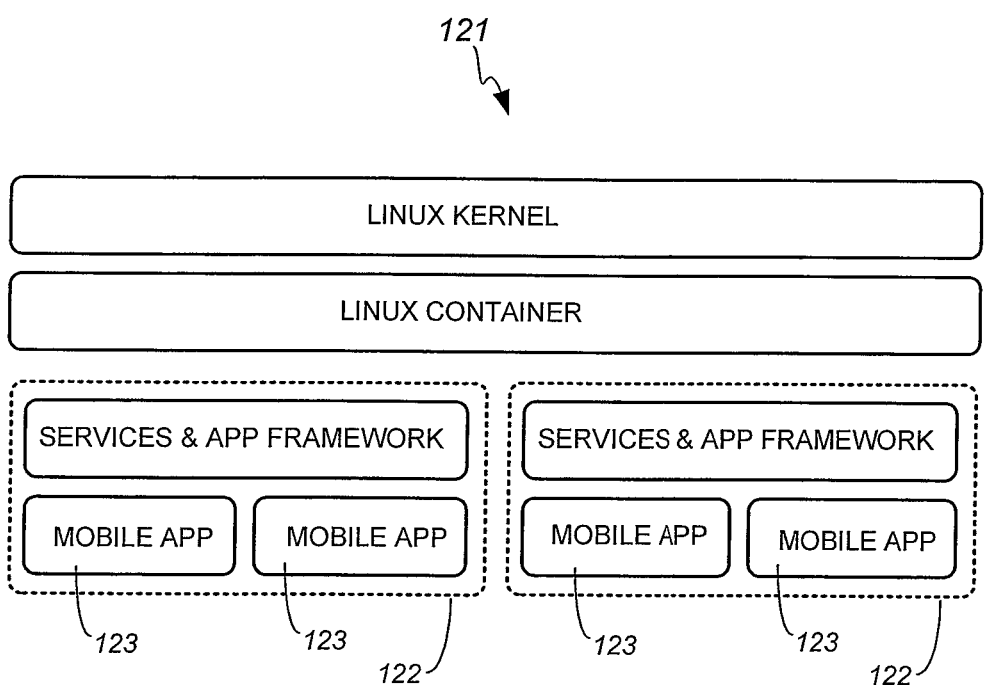
FIG. 2 shows a logical diagram of a mobile operating system in accordance with an embodiment of the present invention.

FIG. 2 shows a logical diagram of a mobile operating system 122 running on a server computer 121 in accordance with an embodiment of the present invention. In the example of FIG. 2, the server computer 121 has an x86 processor and runs a Linux operating system with corresponding Linux kernel. As explained, the server computer 121 runs a plurality of mobile operating systems 122, with each mobile operating system 122 running on a Linux container. In the example of FIG. 2, the mobile operating system 122 is an ANDROID operating system, with corresponding services and application framework (e.g., system layer, kernel layer). The ANDROID operating system application layer includes a plurality of mobile apps 123.

Figure 3:
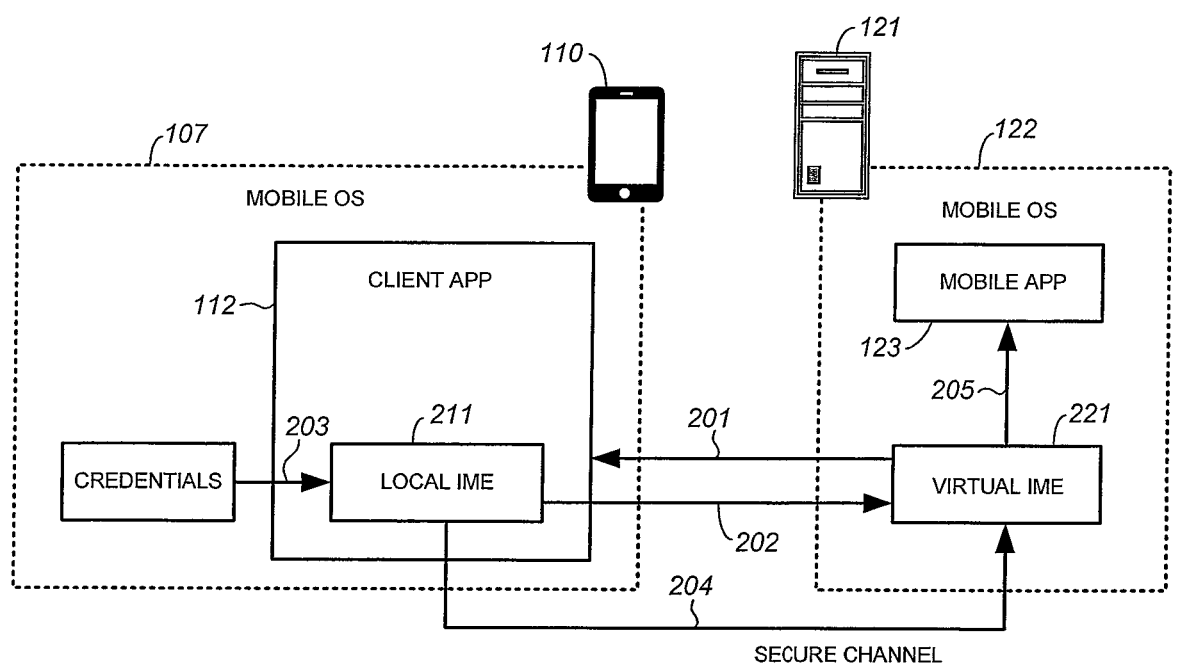
FIG. 3 shows a flow diagram of a method of automatically inputting user credential to a remote mobile app of a virtual mobile infrastructure in accordance with an embodiment of the present invention.

FIG. 3 shows a flow diagram of a method of automatically inputting user credential to a remote mobile app of a virtual mobile infrastructure in accordance with an embodiment of the present invention.

A client app 112 is a local mobile app that is configured to access a remote mobile app, which in the example of FIG. 3 is a mobile app 123 running under a mobile operating system 122 of a server computer 121. The screen image of the mobile operating system 122, which includes a user interface of the mobile app 123, may be displayed on the touchscreen of the mobile device 110 by client-side rendering or server-side rendering as in U.S. Pat. No. 9,300,720, or by some other suitable way of remotely displaying images.

A mobile app 123 may employ a virtual input method editor (IME) 221 to receive user inputs. In this example where the mobile operating system 122 is an ANDROID operating system, the virtual IME 221 may comprise an ANDROID application with IME services. The virtual IME 221 is configured to display a touchscreen keyboard whenever the mobile app 123 is to receive user inputs. The touchscreen keyboard generated by the virtual IME 221 is displayed as part of the screen image of the mobile operating system 122.

As can be appreciated, the user cannot actually use the touchscreen keyboard of the virtual IME 221 because the user is accessing the mobile app 123 from the mobile device 110. That is, the user cannot click, i.e., activate, a key of the touchscreen keyboard of the virtual IME 221. In one embodiment, the virtual IME 221 sends a notification to the client app 112 whenever the mobile app 123 is waiting to receive user inputs (see arrow 201). In response to the notification from the virtual IME 221, the client app 112 invokes a local IME 211, which uses a local IME service of the mobile operating system 107 of the mobile device 110 to display a touchscreen keyboard. The local IME 211 generates a touchscreen keyboard, which is displayed over the touchscreen keyboard of the virtual IME 221 on the touchscreen of the mobile device 110. The user of the mobile device 110 clicks (e.g., touches) the touchscreen keyboard of the local IME 211 to enter a user input. The local IME 211 receives the user input and sends the user input to the virtual IME 221 (see arrow 202), which forwards the user input to the mobile app 123 (see arrow 205).

In one embodiment, the client app 112 is configured to detect when a user clicks on an input field for accepting a credential. For example, when the user clicks on an input field, the client app 112 may receive, e.g., from the local IME 211, the attributes of the input field. The attributes of the input field may indicate the type of the input field. For example, in the ANDROID operating system, an input field for receiving a password may have a type of password, which is different from a plaintext type input field. Input fields may also have a corresponding field name that indicates the requested user input. As a particular example, a field name of "username" or "user" may indicate that the input field is accepting a username.

In response to detecting that the mobile app 123 is waiting to receive credentials from the user, the client app 112 may invoke the local IME 211 to display a touchscreen keyboard that includes an autofill button. When the user clicks on the autofill button of the touchscreen keyboard of the local IME 211, the local IME 211 retrieves previously stored credentials of the user (see arrow 203). The local IME 211 may retrieve the credentials from a non-volatile memory of the mobile device 110 or from other datastore. The credentials, which may comprise a username and a password of the user, may have been previously received from the user during a setup or registration process. The local IME 211 sends the credentials to the virtual IME 221 over a secure channel (see arrow 204). The secure channel may be on the same communication session between the virtual IME 221 and the local IME 211, with one or more of the credentials being encrypted. For example, the local IME 211 may send the username to the virtual IME 221 in plaintext, but may encrypt the password and send the encrypted password to the virtual IME 221. As another example, the local IME 211 may establish an encrypted communication session with the virtual IME 221 and send the password and username over the encrypted communication session. The virtual IME 221 or the mobile app 123 may have a corresponding encryption key for decrypting encrypted communications and data received from the local IME 211 or the client app 112.

The virtual IME 221 receives the credentials from the local IME 211 over the secure channel (see arrow 204) and forwards the credentials to the mobile app 123 (see arrow 205). The mobile app 123 displays the credentials that have been automatically entered in corresponding input fields of the user interface of the mobile app 123, and uses the credentials to authenticate the user.

FIGS. 4-7 show screenshots of the mobile device 110, which illustrate a method of automatically entering user credential to a user interface of a remote mobile app of a virtual mobile infrastructure, in accordance with an embodiment of the present invention. FIGS. 4-7 are explained using previously-described components of the virtual mobile infrastructure 100.

Figure 4:
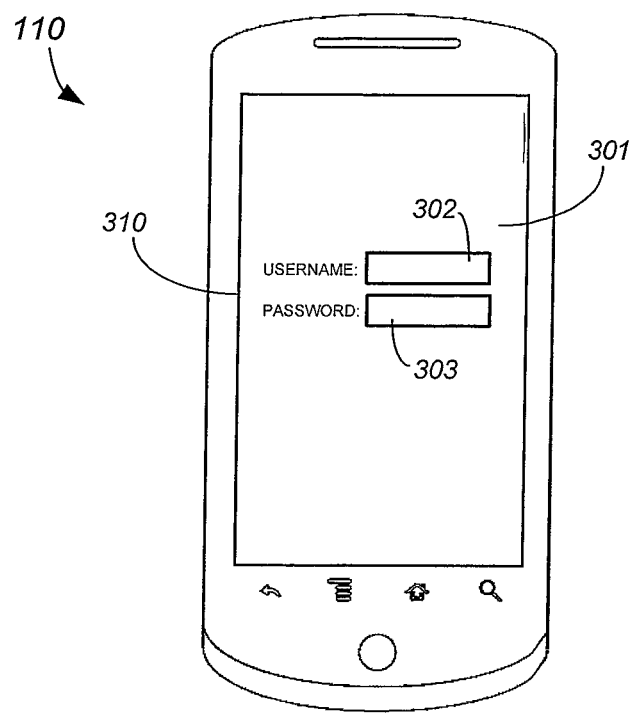
FIGS. 4-7 show screenshots of a mobile device, which illustrate a method of automatically entering user credential to a user interface of a remote mobile app of a virtual mobile infrastructure, in accordance with an embodiment of the present invention.

In the example of FIGS. 4-7, the screen image 301 of the mobile operating system 122 running on the server computer 121 is displayed on the touchscreen 310 of the mobile device 110. When the mobile app 123 requires user input, the mobile app 123 generates a user interface 301 that includes input fields 302 and 303. In the example of FIG. 4, the input field 302 is for receiving a username and the input field 303 is for receiving a password corresponding to the username. The mobile app 123 may use the username and password to authenticate the user. For example, the mobile app 123 may block the user from accessing the mobile app 123 when the username and password do not correspond to an authorized username and password. The user interface 301 may be displayed on the mobile device 110 as part of the screen image of the mobile operating system 122.

Figure 5:
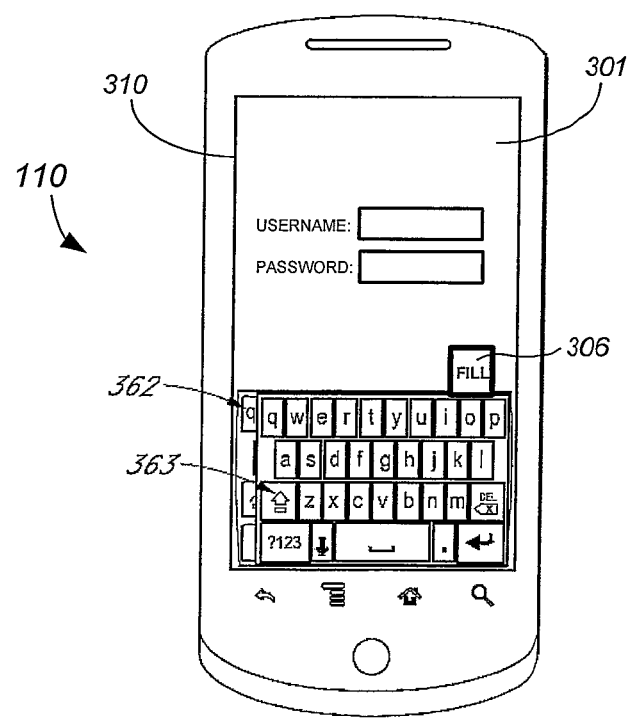

In response to detecting that the mobile app 123 is requesting credentials, which are a username and a password in this example, the client app 112 invokes the local IME 211 to generate and display a touchscreen keyboard 363 as shown in the example of FIG. 5. A touchscreen keyboard 362 of the virtual IME 221 is displayed on the touchscreen 310 as part of the screen image of the mobile operating system 122. To hide the touchscreen keyboard 362 from the user, the touchscreen keyboard 363 of the local IME 211 is displayed over the touchscreen keyboard 362 of the virtual IME 221. This allows the local IME 211 to receive credentials from the user for forwarding to the virtual IME 221.

It is to be noted that in practice, the touchscreen keyboard 362 of the virtual IME 221 is hidden from view, i.e., not generally viewable by the user. The touchscreen keyboard 362 is partially shown in FIGS. 5-7 simply to illustrate that the touchscreen keyboard 363 of the local IME 211 may be displayed over the touchscreen keyboard 362 to hide the touchscreen keyboard 362. As can be appreciated, other ways of hiding the touchscreen keyboard 362 from the user may also be employed without detracting from the merits of the present invention.

Also shown in FIG. 5 is an autofill button 306. The local IME 211 displays the autofill button 306 together with the touchscreen keyboard 363 in the case where the mobile app 123 is waiting to receive credentials from the user. The autofill button 306 may be presented as an extra key of the touchscreen keyboard 363, as a separate radio button, or as some other user interface control that may be activated by the user to automatically enter credentials in corresponding input fields of the user interface 301.

Figure 6:
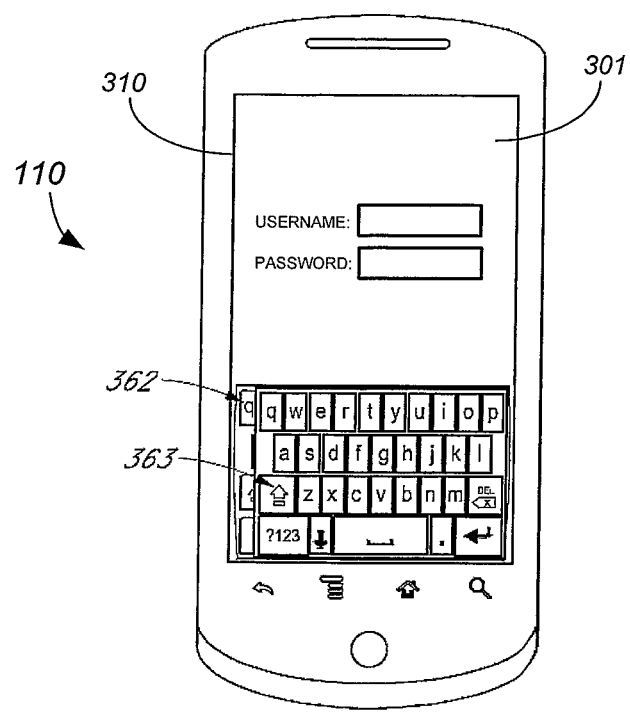
Figure 7:
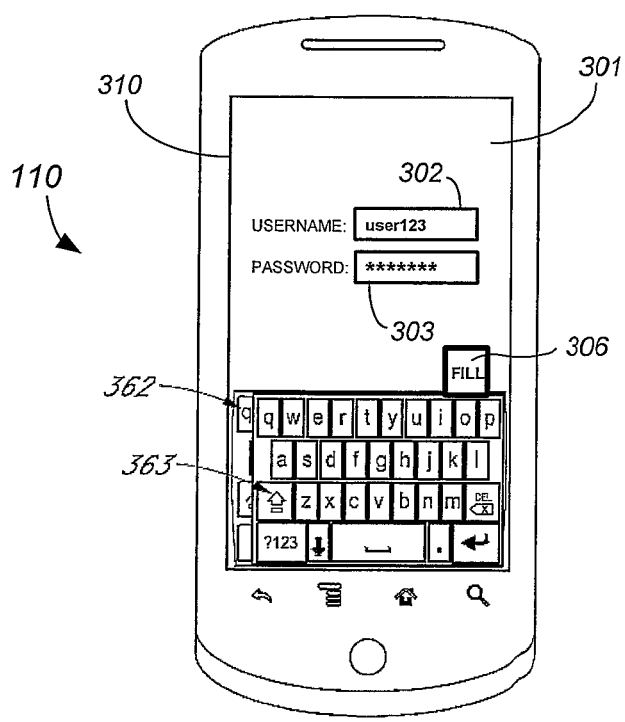

In the example of FIG. 6, following FIG. 5, the local IME 211 removes the autofill button 306 from view when the user clicks on any portion of the touchscreen keyboard 363 other than the autofill button 306. This indicates that the user does not wish to enter credentials by autofill. Otherwise, when the user clicks on the autofill button 306, the local IME 211 retrieves the credentials and provides the credentials to the virtual IME 221. The virtual IME 221 receives the credentials and forwards the credentials to the mobile app 123. The mobile app 123 displays the credentials in corresponding input fields of the user interface 201. This is illustrated in FIG. 7, were the credentials comprising a username and a password are displayed by the mobile app 123 in the input fields 302 and 303, respectively. The password may be displayed in the input field 303 as asterisks to hide the password from others. The mobile app 123 uses the username and password to authenticate the user.

Figure 8:
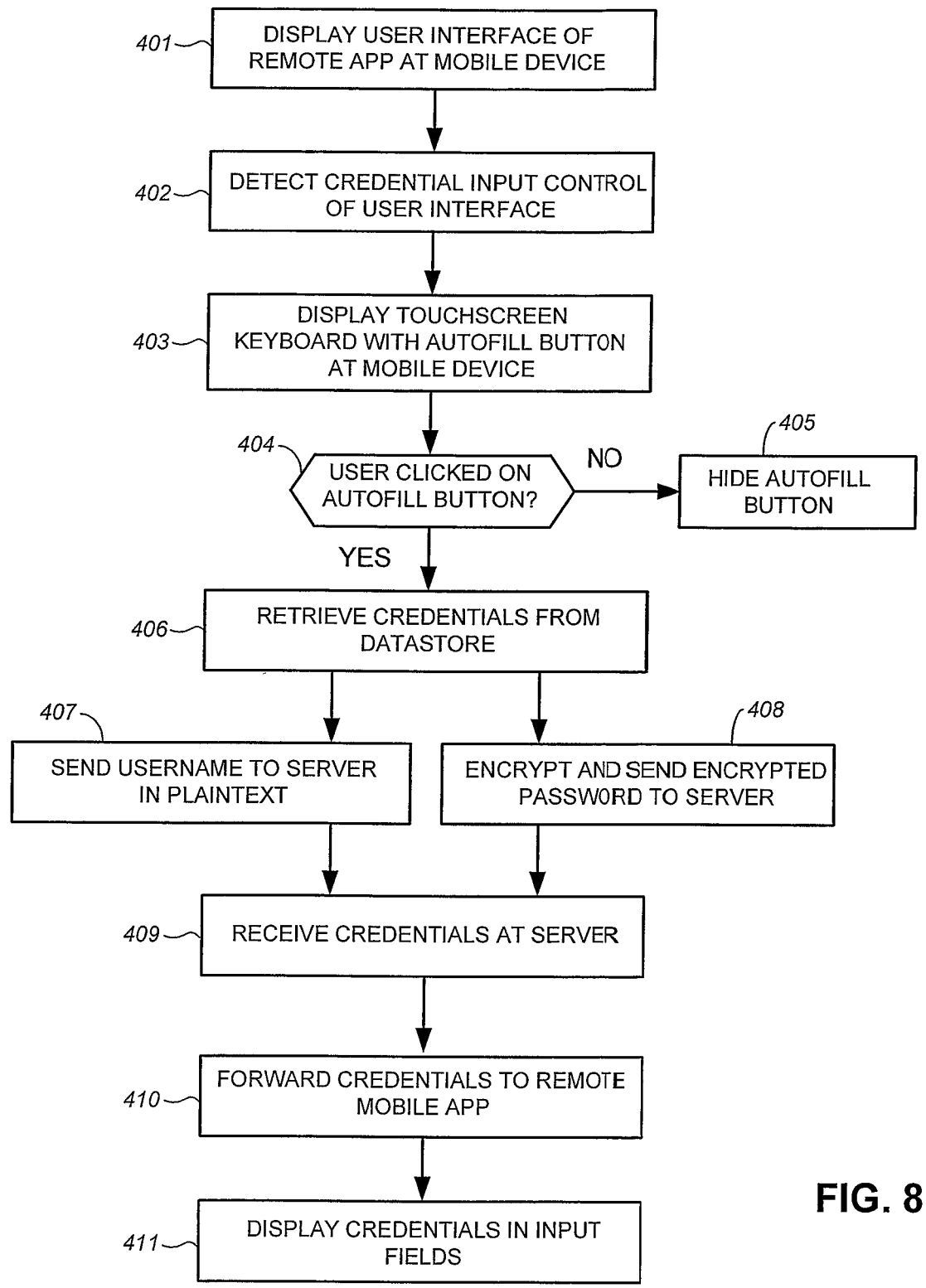
FIG. 8 shows a flow diagram of a method of automatically entering user credential to a user interface of a remote mobile app of a virtual mobile infrastructure in accordance with an embodiment of the present invention.

FIG. 8 shows a flow diagram of a method of automatically entering credentials to a user interface of a remote mobile app of a virtual mobile infrastructure in accordance with an embodiment of the present invention. The method of FIG. 8 is explained using previously disclosed components for illustration purposes only. As can be appreciated, other components may also be employed to perform the method of FIG. 8 without detracting from the merits of the present invention.

The method of FIG. 8 may begin when the mobile app 123 generates a user interface for receiving user input, and the user interface is displayed on the touchscreen of the mobile device 110 (step 401). The client app 112 detects that the user interface includes input fields for receiving credentials (step 402), and in response invokes the local IME 211 to display, at the mobile device 110, a touchscreen keyboard with an autofill button (step 403).

The local IME 211 hides the autofill button when the user does not click on the autofill button (step 404 to step 405). In that case, the local IME 211 receives inputs manually entered by the user on the touchscreen keyboard, and provides the manually-entered inputs to the virtual IME 221. The virtual IME 221, in turn, forwards the manually-entered inputs to the mobile app 123.

When the user clicks on the autofill button, the local IME 211 retrieves the credentials of the user from a datastore (step 404 to step 406). The credentials may comprise a username and a password of the user for accessing the mobile app 123 on the server computer 121. In one embodiment, the local IME 211 sends the username to the virtual IME 221 in plaintext (step 407). In one embodiment, to secure the password, the local IME 211 encrypts the password and sends the encrypted password to the virtual IME 221 (step 408).

The virtual IME 221 receives the credentials at the server computer 121 (step 409), and forwards the credentials to the mobile app 123 (step 410). The mobile app 123 may display the credentials on corresponding input fields of the user interface (step 411).

Figure 9:
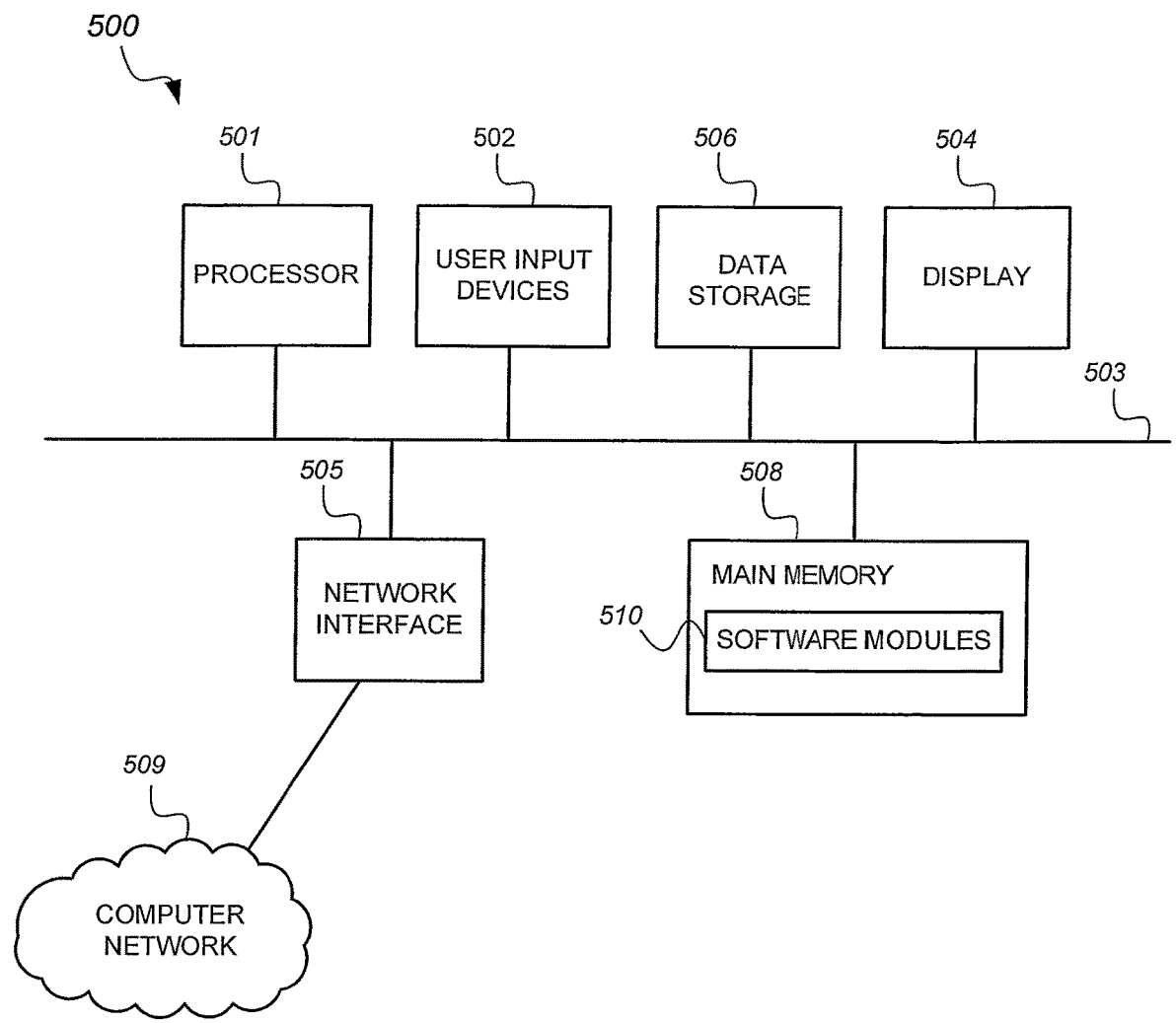
FIG. 9 shows a logical diagram of a computing device that may be employed with embodiments of the present invention.

FIG. 9 shows a logical diagram of a computing device 500 that may be employed with embodiments of the present invention. The computing device 500 may be employed as a mobile device or a server computer, for example. The computing device 500 may have fewer or more components to meet the needs of a particular application. The computing device 500 may include one or more processors 501. A processor 501 may be an ARM processor when the computing device 500 is a mobile device or an x86 processor when the computing device 500 is a server computer, for example. The computing device 500 may have one or more buses 503 coupling its various components. The computing device 500 may include one or more user input devices 502 (e.g., keyboard, mouse), one or more data storage devices 506 (e.g., hard drive, solid state drive, or other non-volatile memory), a display screen 504 (e.g., touchscreen, liquid crystal display), a network interface 505 (e.g., network adapter, cellular interface), and a main memory 508 (e.g., random access memory) depending on the configuration of the computing device 500.

The computing device 500 is a particular machine as programmed with one or more software modules 510, comprising instructions stored non-transitory on the main memory 508 for execution by the processor 501 to cause the computing device 500 to perform corresponding programmed steps. An article of manufacture may be embodied as computer-readable storage medium including instructions that when executed by the processor 501 cause the computing device 500 to be operable to perform the functions of the one or more software modules 510. The software modules 510 may comprise a mobile operating system and a client app with local IME when the computing device 500 is configured as a mobile device. The software modules 510 may comprise a mobile operating system and a mobile app with a virtual IME when the computing device 500 is employed as a server computer.

Systems and methods for automatically entering credentials to a user interface of a remote mobile app of a virtual mobile infrastructure have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
    generating a user interface of a remote mobile app running under a remote mobile operating system, the remote mobile operating system being one of a plurality of remote mobile operating systems running on a server computer;
    displaying the user interface on a touchscreen of a mobile device that is in communication with the server computer;
    detecting, based on an attribute of an input field of the user interface of the remote mobile app, that the remote mobile app is waiting for a credential of a user of the mobile device;
    in response to detecting that the remote mobile app is waiting for the credential of the user, displaying, on the touchscreen of the mobile device, a first touchscreen keyboard of a local input method editor (IME) that is running on the mobile device, the first touchscreen keyboard including an autofill button;
    in response to the autofill button being clicked by the user of the mobile device, retrieving the credential of the user and sending the credential of the user from the mobile device to a virtual IME that is running on the server computer; and
    forwarding, by the virtual IME, the credential of the user to the remote mobile app to automatically enter the credential of the user in the input field of the user interface of the remote mobile app.

2. The method of claim 1, further comprising:
    displaying, on the touchscreen of the mobile device, a second touchscreen keyboard of the virtual IME behind the first touchscreen keyboard.

3. The method of claim 1, wherein the credential of the user is a password for accessing the remote mobile app.

4. The method of claim 3, wherein sending the credential of the user from the mobile device to the virtual IME comprises:
    encrypting the password; and
    sending the encrypted password from the mobile device to the virtual IME.

5. The method of claim 1, wherein the local IME retrieves the credential of the user from a non-volatile memory of the mobile device.

6. A system comprising:
    a server computer comprising at least one processor and a memory, the memory of the server computer storing instructions that when executed by the at least one processor of the server computer cause the server computer to: run a plurality of mobile operating systems, run a remote mobile app under one of the plurality of mobile operating systems, generate a user interface of the remote mobile app, receive a credential of a user, and enter the credential of the user in a corresponding input field of the user interface; and
    a mobile device comprising at least one processor and a memory, the memory of the mobile device storing instructions that when executed by the at least one processor of the mobile device cause the mobile device to: display the user interface on a touchscreen of the mobile device, detect from an attribute of the corresponding input field of the user interface of the remote mobile app that the remote mobile app is waiting to receive the credential of the user, display a touchscreen keyboard with an autofill button on the touchscreen of the mobile device in response to detecting that the remote mobile app is waiting to receive the credential of the user, retrieve the credential of the user in response to the user clicking on the autofill button, and provide the credential of the user to the server computer.

7. The system of claim 6, wherein the credential of the user is a password for accessing the remote mobile app.

8. The system of claim 7, wherein the instructions stored in the memory of the mobile device when executed by the at least one processor of the mobile device cause the mobile device to: encrypt the password and send the encrypted password to the server computer.

9. The system of claim 6, wherein the instructions stored in the memory of the mobile device when executed by the at least one processor of the mobile device cause the mobile device to: display the touchscreen keyboard with the autofill button over another touchscreen keyboard of an input method editor (IME) running on the server computer.

10. A computer-implemented method comprising:
    displaying, on a touchscreen of a mobile device, a user interface of a remote mobile app that runs under a remote mobile operating system, the remote mobile operating system running on a server computer that is in communication with the mobile device;

detecting, based at least on an attribute of an input field of the user interface, that the input field is for receiving a credential of a user of the mobile device;

in response to detecting that the input field is for receiving the credential of the user, displaying an autofill button on the touchscreen of the mobile device;

in response to the autofill button being activated by the user, retrieving the credential of the user;

sending the credential of the user from the mobile device to the server computer; and in the server computer, providing the credential of the user to the remote mobile app.

11. The method of claim 10, wherein the credential of the user is a password for accessing the remote mobile app.

12. The method of claim 11, wherein sending the credential of the user from the mobile device to the server computer comprises:

encrypting the password; and sending the encrypted password from the mobile device to the server computer.

13. The method of claim 10, wherein the remote mobile operating system is one of a plurality of remote mobile operating systems running on the server computer.

14. The method of claim 10, wherein displaying the autofill button on the touchscreen of the mobile device comprises:

displaying, on the touchscreen of the mobile device, a first touchscreen keyboard generated by a local input method editor (IME) of the mobile device, the touchscreen keyboard including the autofill button.

15. The method of claim 14, wherein the first touchscreen keyboard is displayed over a second touchscreen keyboard of a virtual IME running at the server computer.

* * * * *